United States Patent [19]

Meier

[11] 4,168,372

[45] Sep. 18, 1979

[54] METHOD FOR REDUCING THE UNREACTED VINYLIDENE CHLORIDE CONTENT OF A VINYLIDENE CHLORIDE POLYMER

[75] Inventor: John W. Meier, Clinton, Iowa

[73] Assignee: E. I. Du Pont de Nemours and Company, Wilmington, Del.

[21] Appl. No.: 705,468

[22] Filed: Jul. 15, 1976

[51] Int. Cl.$^2$ ............................ C08F 6/16; C08F 6/14
[52] U.S. Cl. .................................. 528/485; 526/216; 526/229; 526/317; 526/329.3; 526/343; 528/487
[58] Field of Search .................. 526/343, 80, 229, 41, 526/57; 528/488, 485, 487

[56] References Cited

U.S. PATENT DOCUMENTS

| | | | |
|---|---|---|---|
| 2,662,867 | 12/1953 | Hoertz | 260/29.6 F |
| 2,776,273 | 1/1957 | Richard | 526/343 X |
| 2,843,572 | 7/1958 | Wooten, Jr. | 526/343 X |
| 3,423,352 | 1/1969 | Levine | 526/80 X |
| 3,532,675 | 10/1970 | Rivlin | 526/343 X |
| 3,692,726 | 9/1972 | Oehmichen | 260/29.6 R |
| 3,832,317 | 10/1974 | Mikofalvy | 526/343 X |
| 4,008,361 | 2/1977 | Park | 528/503 |
| 4,015,065 | 3/1977 | Park | 528/503 |

FOREIGN PATENT DOCUMENTS

| | | | |
|---|---|---|---|
| 7605149 | 7/1976 | Japan | 528/487 |
| 965022 | 7/1964 | United Kingdom | 526/343 |

*Primary Examiner*—Christopher A. Henderson, Jr.

[57] ABSTRACT

A method for reducing the amount of free vinylidene chloride in an aqueous dispersion of a vinylidene chloride polymer by adding to the dispersion a small amount of a redox initiator, and then subjecting the dispersion to a temperature in the range of room temperature to about 40° C. for a period of at least one hour. Substrates such as packaging films can be coated with the aqueous dispersion, or with a solvent solution of the polymer after separation from the dispersion. By use of such a coating bath, the amount of vinylidene chloride vapor in the atmosphere near the coating station is significantly less than the amount when using a coating bath of polymer not subjected to the method of the invention.

21 Claims, No Drawings

METHOD FOR REDUCING THE UNREACTED VINYLIDENE CHLORIDE CONTENT OF A VINYLIDENE CHLORIDE POLYMER

BACKGROUND OF THE INVENTION

This invention is concerned with improvements in and relating to polymers of vinylidene chloride. More specifically, it relates to a method for lowering the amount of unreacted vinylidene chloride which is contained in a vinylidene chloride polymer.

It is known that many polymerization reactions do not proceed quantitatively, that is, that a variable amount of unreacted or "free" monomer remains when polymerization stops. In the case of vinylidene chloride polymers and copolymers, although polymerization can easily be carried to greater than 99% completion, a fraction of a percent of the monomers generally remains unreacted. The reason for this is not always understood, for it sometimes happens when active polymerization initiator remains in the reaction system.

Polymers and copolymers of vinylidene chloride (referred to hereinafter collectively as polymers) are highly useful as coatings on a variety of substrates, including such things as various types of packaging films, such as regenerated cellulose, polyester and polyolefin films. Although the amount of free vinylidene chloride in the final coated article is ordinarily reduced to no detectable amount during the drying step of the coating process, it is nevertheless desirable to lower the amount of unreacted vinylidene chloride contained in such polymers as prepared, so as to lower the amount of vinylidene chloride vented from the coating tower with the exhaust drying gases, and to minimize the exposure of personnel working in or near the coating station to vinylidene chloride gas which vaporizes from the coating bath. Such vaporization occurs from both aqueous dispersions and organic solvent solutions of such polymers.

In British Pat. No. 573,369 there is disclosed a polymerization process for vinylidene chloride polymers which employs a persulfate initiator and a compound capable of taking up molecular oxygen such as potassium meta-bisulfite, for the purposes of increasing the yield of polymer and decreasing the time required for polymerization. However, such a process has been found in practice to give polymers which still contain unreacted monomers including vinylidene chloride in greater or lesser amount.

Consequently, one method widely employed for removing unreacted monomer from an aqueous polymer dispersion is by "devolatizing" or stripping, wherein unreacted monomer is removed by vaporizing it, usually under reduced pressure and generally with heat. Such is disclosed, for example, in U.S. Pat. No. 2,989,517 (Column 6, lines 63–65, and Column 8, lines 45 ff.) and in U.S. Pat. No. 3,879,359 (Column 3, lines 67–68). Even more complex stripping processes are known, such as that described in U.S. Pat. No. 2,713,568, wherein a small amount of an alkyl acrylate is added to the polymer dispersion just in advance of stripping the unreacted monomers therefrom. All such procedures, however, require substantial investment in distillation equipment including heaters, vacuum pumps, condensers, etc., and furthermore are expensive to operate on a commercial scale in view of the excessive amount of energy required to remove the small amount of monomer in question.

SUMMARY OF THE INVENTION

According to the present invention there is provided a method for reducing the amount of free vinylidene chloride in an aqueous dispersion of a vinylidene chloride polymer wherein there is added to said dispersion a small amount of a redox initiator, and then subjecting said dispersion to a temperature in the range of room temperature to about 40° C. for a period of at least 1 hour.

A principal advance of the method of the invention is the low investment required for its operation. A holding tank is all that is necessary. The tank may be stirred, if desired, but even that is not necessary. A further advance of the method is high efficiency at very low operating cost, which amounts to little more than the cost of the small amount of initiator used.

DESCRIPTION OF THE PREFERRED EMBODIMENTS

Polymerization of vinylidene chloride with or without comonomers can be carried out by emulsifying the monomers in water with the aid of a surfactant, and effecting polymerization with a variety of initiators to form an aqueous polymer dispersion. While it is believed that the method of the invention is applicable to polymers containing any amount of vinylidene chloride, the polymers specifically dealt with herein are those which contain at least 80% by weight of vinylidene chloride. The comonomers are other ethylenically unsaturated monomers copolymerizable therewith as described in U.S. Pat. No. 3,179,532. Polymerization can be initiated with a free radical forming initiator, either thermally at about 60° to 90° C. using a thermally decomposable initiator, or at lower temperature with a redox initiator. Thermally decomposable initiators include compounds such as the persulfates, peroxides and azo compounds, all of which are well known in the art. Redox initiators, also well known in the art, include for example a persulfate together with a bisulfite activator, generally in the form of their water soluble ammonium or alkali metal salts. In combination with the redox initiators, there is often used in small amount an accelerator, for example an iron salt, either ferrous or ferric, such as ferrous ammonium sulfate. In the present invention it is preferred to use dispersions which have been made with a redox initiator or with thermal decomposition of a persulfate, for reasons which are indicated below.

As is indicated above, one of the primary goals which impelled the work which led to the present invention was the desire to lower the amount of vinylidene chloride ($VCl_2$) in the atmosphere at and near a coating station where a bath of the polymer is used. I have found empirically that a level of 5 ppm in air will not be exceeded if the coating bath is an aqueous dispersion of the polymer which contains no more than approximately 600 ppm $VCl_2$ based on the weight of the dispersion. It has also been found that if the polymer is isolated from an aqueous dispersion which contains 600 ppm $VCl_2$ and a solution of that polymer in an organic solvent such as a mixture of tetrahydrofuran and toluene is prepared for a solvent coating process, although the isolated polymer will contain only about 60 ppm $VCl_2$, the atmosphere near the coating station will nevertheless contain near 5 ppm $VCl_2$. In order to consistently remain below the 5 ppm level in air, I prefer to reach a level of below 300 ppm $VCl_2$ in the aqueous polymer dispersion, and more preferably, below 100 ppm. Such levels can consistently be attained by the method of the invention. In circumstances when a level of substantially 0 ppm $VCl_2$ must be attained, the method of the invention is also adapted to attain that level.

It should be understood that the above correlations of $VCl_2$ in air with $VCl_2$ content of an aqueous polymer dispersion or solvent coating bath vary somewhat with various factors, such as geometry and arrangement of the coating station, temperature of the bath, air flows, etc. The method of the invention, however, remains valid for consistently attaining under any specific set of conditions whatever level of $VCl_2$ is not to be exceeded in the coating bath and in the air at the coating station.

The amount of redox initiator employed in the method of the invention is at least 50%, preferably 80%, of that which is sufficient to polymerize 98% of the total initial amount of monomer in a period of 4 hours at a temperature no greater than 40° C.

More explicitly, the amount of each component of the initiator should be at least 0.05% by weight of the polymer. Preferably, the amount of each component of the initiator will be in the range of 0.1 to 0.3% by weight of the polymer.

A common redox initiator which is useful in the method of the invention is the combination of ammonium persulfate and meta sodium bisulfite. While they need not be used in equal weight amounts, frequently equal weights of the two are used.

The method of the invention can be carried out in the range of room temperature to approximately 40° C. It is preferred to operate at or near toom temperature, inasmuch as the amount of free $VCl_2$ is efficiently lowered at that temperature, and further because such entails no expense for energy to heat the dispersion. On the other hand, if desired, it is possible to add the initiator to the dispersion immediately after preparation while it is still warm from the exothermic polymerization and to hold it in an insulated tank, whereby it will cool slowly to room temperature. An uninsulated tank can also be used. However, at temperatures above 40° C., the redox initiator is more rapidly exhausted due to the greater rate of free radical formation, and so greater amounts may be needed at such temperatures. Also, more coagulum (nondispersed polymer which is removed and discarded) is formed above 40° C. In view of such factors, temperatures below 40° C. are preferred. Temperatures at or near room temperature are most preferred for the reasons given above, and further because the activity of the initiator is maintained over a longer period of time than at higher temperatures. Under conditions existing in manufacturing facilities, room temperature referred to herein can be as low as approximately 15° C.

Following addition of initiator, a significant lowering of the amount of free $VCl_2$ is observed even within the first hour. It is preferred, however, to hold the dispersion for at least 4 hours, or more preferably, at least 20 hours, to achieve even greater reduction in the amount of $VCl_2$. Most of the lowering of the amount of free $VCl_2$ ordinarily occurs within the first 24 hours after adding the redox initiator. In some cases, further gradual lowering of free $VCl_2$ continues to occur over a period up to a week.

In some cases, an iron salt will be present, if it was used as an accelerator for a redox initiator during the polymer forming step. It is not needed in the method of the invention, and in those cases when none was initially used, as in cases of thermally initiated polymerization, none need by added during the method of the invention. It is prefered, however, that an iron salt be present, and, when desired, it can be added in the method of the invention even if not present in the polymer forming step.

By using an amount of initiator toward the upper end of the indicated operable amounts, about 0.3 to 0.4% by weight of the polymer of each component of the redox initiator, it is possible to lower the amount of free $VCl_2$ to substantially 0 ppm. Although use of such larger amounts of initiator in many instances is accomplished by the simultaneous formation of some coagulum, the latter can be minimized or completely eliminated by adding the initiator as a dilute aqueous solution. Any lowering of the percent solids of the dispersion by dilution is generally of little consequence, or can be compensated for in the initial formulation.

The initiator is ordinarily added as a dilute aqueous solution, usually no greater than 6% by weight of the solution. It is generally preferred to use 2 to 6% by weight solutions, so as to avoid unnecessarily diluting the aqueous polymer dispersion. In some cases, solutions greater than 6% by weight can be used. The more concentrated solutions, however, are ordinarily to be avoids, as they often being about coagulation of the polymer in the dispersion by the well-known salting-out effect due to the concentration of ions in solution. The less soluble persulfates, for example, potassium persulfate, if used, should be added as dilute solutions, as use of a slurry of the solid has led to coagulation of the polymer. In general, it is desirable to hold the amount of inorganic salts in the dispersion to the minimum necessary, so as to prolong the storage life of the dispersion.

The components of the redox initiator can be added separately, or together in the same solution. Separate addition is preferred, especially in large scale reactions, so as to avoid loss of some of the initiator activity by premature reaction between the oxidizing and reducing components. If added together in one solution, the solution should be held only briefly before use in minimize loss of activity, which is usually possible in small scale reactions.

It is possible to carry out the method of the invention over a wide period of time after preparation of an aqueous polymer dispersion. Thus, the invention has been carried out using aqueous polymer dispersions which were only a few minutes old, to as long as six days old (Example 2), with equal success. Ordinarily, the method of the invention will be carried out when conversion of monomer to polymer is at least 99% complete, and preferably when it is at least 99.7% complete.

While all aspects of the invention are not completely understood, there appears to be a need in the method for initiator activity over an extended period of time. Attempts to lower the amount of free $VCl_2$ remaining when polymerization is almost complete, by raising the temperature and pressure in the reaction vessel in an attempt to "finish" the reaction, have not been effective. Even when extra initiator is added, attempts to increase the rate of lowering of the amount of free $VCl_2$ by increasing the temperature, which ordinarily increases the rate of a chemical reaction, results in less effective lowering of the amount of free $VCl_2$ as compared to the effect at room temperature. Thus, it is possible that a typical polymer-forming reaction, as during the initial stages of polymerization, may not be occurring during the method of the invention. Furthermore, attempts to obviate the method of the invention by increasing the amount of initiator used at the start of the polymer forming step have failed for not only does free $VCl_2$ nevertheless remain, but the polymer properties are altered; the resulting polymer has a lower relative viscosity, and there is a deleterious effect on the solubility of the polymer in organic solvents. In comparison, the method of the invention succeeds in lowering the amount of free $VCl_2$ to the required level while producing no deleterious effect on the polymer viscosity, solubility, haze or amount of gel particles.

In a few isolated instances, failure to lower the amount of free $VCl_2$ to below 600 ppm has been observed; we have no explanation of these cases, but such occurrences have been infrequent. In cases where more than 10,000 ppm $VCl_2$ remains when the initial polymer forming reaction stops, a single addition of redox catalyst according to the method of the invention may not lower the free $VCl_2$ to below 600 ppm, and a further addition according to the method is then required to attain a free $VCl_2$ level below 600 ppm. All such instances are probably due to the inadvertant presence of poisons in the system which destroy the effectiveness of the initiator.

In cases where the initiator used in the polymer forming step is not the redox initiator which is to be used in the method of the invention, it should be noted that there may be some cases be an antagonistic effect between the first initiator and the redox initiator, which will render the redox initiator ineffective. Such cases will be obvious, because there will be little lowering of the amount of free $VCl_2$ which remains. Such may occur when the first initiator is a peroxide such as hydrogen peroxide or benzoyl peroxide. When such cases occur, it becomes necessary to destroy residual amounts of the first initiator either thermally or chemically before adding the redox initiator according to the method of the invention.

Similar considerations must also be kept in mind in those instances when an inhibitor to prevent corrosion of metal surfaces, such as hydrogen peroxide, is added to the aqueous polymer dispersion prior to its use in a dispersion coating process. In such cases, addition of the peroxide must be delayed until after the method of the invention has been completed, so as to avoid having the peroxide render the redox catalyst ineffective.

It is preferred to carry out the method of the invention under a gas depleted in oxygen, as too high an oxygen concentration may adversely affect the initiator system.

Test Methods

Analysis for vinylidene chloride ($VCl_2$) was carried out by gas chromatography. The column used was stainless steel, 10 feet long and 0.125 inch inside diameter, containing a packing of 15% by weight silicone oil (General Electric Se-30) supported on acid-washed diatomaceous silica (100 to 120 mesh, Johns-Manville AW Chromsorb W). Samples analyzed were 5-cc gas phase samples, and nitrogen was used as the carrier gas. Detection was with a flame ionization detector. Flow rates used were 20 cc/min. for the carrier gas, and 40 cc/min. of hydrogen and ca. 150 cc/min. of air to the detector. The column was heated isothermally at 65° C., the injector at 130° C., and the detector at 160° C. The scale on the recording chart was calibrated by using a commercially available standard gas mixture containing 37.0 ppm by weight vinylidene chloride in nitrogen.

The technique used for collecting a gas sample to be analyzed for $VCl_2$ (for example, near a coating tower where a base film is being coated with a bath of a vinylidene chloride copolymer) was simply to empty a water-filled jar so as to bring about a positive displacement of gas into the jar, and to close the jar with a lid containing a septum through which a hypodermic needle can be inserted to permit later sampling of the gas. Before sampling the gas in the jar, it was heated in a water bath at 55° C. for 15 minutes.

For determination of unreacted vinylidene chloride in an aqueous polymer dispersion, a 1 microliter sample of the dispersion was injected into a nitrogen-filled jar closed with a lid as described above. The jar was heated in a water bath at 55° C. for 15 minutes, during which time the jar was shaken at least five times to promote vaporization of any unreacted $VCl_2$ in the aqueous dispersion. A 5-cc sample of the gas phase was removed through the septum and analyzed as above. From the indicated value of ppm $VCl_2$ in the gas phase, the volume of the jar, and the weight of one microliter of the aqueous dispersion, it is a simple calculation to determine the ppm $VCl_2$ based on the weight of the dispersion.

The relative viscosity of vinylidene chloride copolymers reported herein was determined using a 1% by weight solution of the polymer in tetrahydrofuran and a No. 50 Ostwald-Fenske viscometer at 25° C.

EXAMPLE 1

To a 2-liter flask equipped with a reflux condenser and stirrer and immersed in a water bath at 35° C. were added, in the following order, 803 g water, 6 g of a 5% by weight solution of sodium lauryl sulfate in water, 3.6 g itaconic acid, 1.5 g ammonium persulfate (APS), 1.5 g meta sodium bisulfite (MSB), and 4.0 g of a 0.12% by weight aqueous solution of ferrous ammonium sulfate. A mixture of 546 g uninhibited vinylidene chloride ($VCl_2$), 36 g acrylonitrile, and 18 g methyl methacrylate was then added at a uniform rate over a period of 150 minutes. Polymerization occurred at a rate approximately that of the monomer addition, and was almost complete at the end of the 150-minute period, there remaining only an undesired small quantity of residual monomer which, in repeated runs, included vinylidene chloride in an amount of about 1500 to 2500 ppm of the polymer dispersion. A non-dispersed coagulum amounting to about 0.3% by weight of the polymer was removed by filtration.

Four duplicate polymer dispersions, designated A through D, were prepared as described above and each was divided into two equal parts, 1 and 2. Ten minutes after the end of monomer addition, to part 2 of each of the dispersions was added with stirring 50 g of water containing dissolved varying amounts of APS and MSB as indicated in Table 1. In these runs, equal weights of APS and MBS were used in varying amounts. To part 1 of each of the dispersions, retained as controls, was added with stirring 50 g of water only. The polymer dispersions were then held at room temperature in closed containers without agitation. Periodically, samples were removed for determination of unreacted vinylidene chloride by the analytical method described above. The results are given in Table 1; times indicated in the table are elapsed time following the second addition of initiator. In some cases, additional coagulum, as indicated in the Table, formed upon addition of the second quantity of initiator.

Dispersion B-2 constitutes a preferred result, inasmuch as residual VCl$_2$ is reduced to a very low level, while avoiding formation of additional coagulum. In the event that a dispersion containing essentially no residual VCl$_2$ is required, dispersion C-2 constitutes a preferred result, as the desired result is attained with formation of only a small amount of coagulum. It is believed that formation of coagulum in runs C-2 and D-2 can be avoided by adding the indicated amounts of initiator dissolved in somewhat larger amounts of water so as to lower the salt concentration. By comparison of parts 1 and 2 of each dispersion, it can be seen that the method of the invention has minimal effect on the relative viscosity of the resulting polymer.

TABLE 1

| Dispersion | A-1 | A-2 | B-1 | B-2 | C-1 | C-2 | D-1 | D-2 |
|---|---|---|---|---|---|---|---|---|
| APS, g | 0 | 0.3 | 0 | 0.6 | 0 | 0.9 | 0 | 1.2 |
| MSB, g | 0 | 0.3 | 0 | 0.6 | 0 | 0.9 | 0 | 1.2 |
| APS, % by wt. of polymer | 0 | 0.1 | 0 | 0.2 | 0 | 0.3 | 0 | 0.4 |
| MSB, % by wt. of polymer | 0 | 0.1 | 0 | 0.2 | 0 | 0.3 | 0 | 0.4 |
| ppm VCl$_2$. | | | | | | | | |
| 1 hour | 1434 | 916 | 1434 | 817 | 1534 | 440 | 1424 | 450 |
| 19 hours | 492 | 114 | 521 | 29 | 457 | 9 | 546 | 4 |
| 43 hours | 543 | 125 | 556 | 33 | 503 | 6 | 564 | 5 |
| 6 days | 660 | 116 | 480 | 24 | 640 | 0 | 560 | 0 |
| Coagulum, % by weight of polymer | 0 | 0 | 0 | 0 | 0 | 1.0 | 0 | 1.7 |
| Relative viscosity of polymer | 1.547 | 1.548 | 1.593 | 1.576 | 1.553 | 1.547 | 1.507 | 1.513 |

EXAMPLE 2

A 1500-gallon reactor with stirrer and condenser was charged with 4562 lb. water, 5.3 lb. of a 30% by weight aqueous solution of sodium lauryl sulfate, 16 lb. itaconic acid, 8 lb. APS, 8 lb. MSB, and 55 cc of a 16% by weight aqueous solution of ferrous ammonium sulfate. After heating the charge to 35° C., a mixture of 2912 lb. VCl$_2$, 192 lb. acrylonitrile, and 96 lb. methyl methacrylate was added at a uniform rate over 145 minutes. The temperature of the charge was maintained at 35°–40° C. by circulating cooling water through the reactor jacket. Polymerization was almost complete at the end of the 145-minute period, there remaining only a small quantity of residual monomer including 2345 ppm VCl$_2$ based on the weight of dispersion. A small sample of the dispersion was removed and retained in a closed container (part A).

Approximately 70 minutes after completion of monomer addition, to the remainder of the polymer dispersion in the reactor was added with stirring a solution of 6.4 lb. APS (0.2% by weight based on polymer) and 6.4 lb. MSB (0.2% by weight based on polymer) in 520 lb. water, and the dispersion was transferred to a closed storage tank (part B).

Both parts A and B were held at room temperature without agitation. Small portions were removed periodically from both parts for determination of unreacted vinylidene chloride. The results are given in Table 2.

TABLE 2

|  |  | part A | part B |
|---|---|---|---|
| VCl$_2$, ppm, | initial | 2345 | 2345 |
|  | 80 min. | — | 1524 |
|  | 19 hr. | 1879 | 138 |
|  | 6 days | 1772 | 88 |

To the remainder of part A which had been held for 6 days and which contained 1772 ppm VCl$_2$ was added with stirring 0.2% by weight APS based on polymer and 0.2% by weight MSB based on polymer (dissolved in 81.25 g of water per g of APS or MSB), and the resulting dispersion was stored in a closed container. A sample removed 20 minutes after addition of initiator analyzed for 924 ppm VCl$_2$, and a sample removed 23 hours after addition of initiator analyzed for 34 ppm VCl$_2$. This part of this example shows that even after 6 days storage of a polymer dispersion containing a high residual VCl$_2$ content, the amount of unreacted VCl$_2$ can be markedly lowered by addition of initiator.

EXAMPLE 3

The procedure of paragraph 1 of Example 1 was employed except that 903 g of water was used. Four duplicate polymer dispersions, designated E through H, were prepared in this way. Ten minutes after the end of monomer addition, to each of runs F, G and H was added with stirring 50 g of water containing dissolved therein varying amounts of APS and MSB as indicated in Table 3. To run E, employed as a control, was added with stirring 50 g of water only. A small part of each of the four runs, designated part 1, was removed and retained in a closed container at ambient temperature without agitation. The remaining parts of runs E and H, designated part 2, were heated in closed containers in a water bath to 50° C., held at that temperature for 1 hour, removed from the water bath and permitted to cool, and held in closed containers at ambient temperature without agitation. The remaining parts of runs F and G were each divided into two equal parts, designated parts 2 and 3; parts 2 were heated in a water bath as described above except that they were heated at 40° C. for 1 hour, and parts 3 were similarly heated to 50° C. for 1 hour. Samples were periodically removed from all parts for determination of unreacted vinylidene chloride, and the results are given in Table 3. In some cases, additional coagulum formed, as shown in the Table.

TABLE 3

| Dispersion | E | F | G | H |
|---|---|---|---|---|
| APS, g | 0 | 0.9 | 0.9 | 1.8 |
| MSB, g | 0 | 0.45 | 0.9 | 1.8 |
| APS, % by weight of polymer | 0 | 0.15 | 0.15 | 0.3 |
| MSB, % by weight of polymer | 0 | 0.075 | 0.15 | 0.3 |

|  | E-1 | E-2 | F-1 | F-2 | F-3 | G-1 | G-2 | G-3 | H-1 | H-2 |
|---|---|---|---|---|---|---|---|---|---|---|
| Temperature*, °C. | RT | 50 | RT | 40 | 50 | RT | 40 | 50 | RT | 50 |
| ppm VCl$_2$, 19 hours | 1050 | 640 | 160 | 280 | 240 | 140 | 210 | 440 | 27 | 110 |
| 4 days | 1300 |  | 115 |  |  | 150 |  |  | 15 |  |

TABLE 3-continued

| Coagulum, g | 2 | 0 | 3 | 3 | 5 | 34 |

*RT means room temperature

EXAMPLE 4

The procedure of paragraph 1 of Example 1 was followed except that 903 g of water was used. From the resulting dispersion were taken three equal samples, designated parts 1 to 3, each weighing 253.3 g and containing 100 g of polymer. About 80 minutes after addition of monomer was completed, to each of parts 2 and 3 was added with stirring varying amounts of APS and MSB dissolved in water as indicated in Table 4. No addition was made to part 1. All parts were held in closed containers at room temperature without agitation. Samples were removed periodically from all parts for determination of unreacted vinylidene chloride, and the results are given in Table 4.

TABLE 4

| Dispersion | 1 | 2 | 3 |
|---|---|---|---|
| APS, ml of 1.5% by wt. aqueous solution | 0 | 6.7 | 13.3 |
| MSB, ml of 1.5% by wt. aqueous solution | 0 | 6.7 | 13.3 |
| APS, % by wt. of polymer | 0 | 0.1 | 0.2 |
| MSB, % by wt. of polymer | 0 | 0.1 | 0.2 |
| ppm $VCl_2$, | | | |
| 0.5 hour | 2144 | 1471 | 1294 |
| 3 hours | 1531 | 611 | 438 |
| 20 hours | 1100 | 205 | 42 |
| 70 hours | 1313 | 249 | 40 |

EXAMPLE 5

To a 2-liter flask equipped with a reflux condenser and stirrer and immersed in a water bath at 35° C. were added 369 g water, 15 g of a 30% by weight aqueous solution of sodium lauryl sulfate, 3.0 g itaconic acid, 0.45 g APS, 0.23 g MSB, and 2.5 g of a 0.12% by weight aqueous solution of ferrous ammonium sulfate. To the above was added all at one time a mixture of 273 g $VCl_2$, 15 g methyl acrylate, and 9 g acrylonitrile. Polymerization occurred at a steady rate for 124 minutes, as indicated by reflux of $VCl_2$ over that time, and then reflux of $VCl_2$ stopped. At this point, 17.5 g of 20% by weight aqueous solution of sodium lauryl sulfate was added with stirring to prevent coagulation of the dispersion. The resulting dispersion was divided into three equal parts, designated 1 to 3, each weighing 234.9 g and containing 100 g of polymer. About 80 minutes after reflux of $VCl_2$ stopped, to each of parts 2 and 3 was added with stirring varying amounts of APS and MSB dissolved in water as indicated in Table 5. No addition was made to part 1. All parts were held in closed containers at room temperature without agitation. Samples were removed periodically from all parts for determination of unreacted $VCl_2$, and the results are given in Table 5.

TABLE 5

| Dispersion | 1 | 2 | 3 |
|---|---|---|---|
| APS, ml of 1.5% by weight aqueous solution | 0 | 6.7 | 13.3 |
| MSB, ml of 1.5% by weight aqueous solution | 0 | 6.7 | 13.3 |
| APS, % by weight of polymer | 0 | 0.1 | 0.2 |
| MSB, % by weight of polymer | 0 | 0.1 | 0.2 |
| ppm $VCl_2$, | | | |
| 0.5 hour | 2881 | 1668 | 2552 |
| 3 hours | 1403 | 1067 | 538 |
| 20 hours | 353 | 53 | 8 |
| 70 hours | 465 | 130 | 16 |

EXAMPLE 6

A sealed 1500-gallon reactor with stirrer was charged with 6748 lb. water, and the charge was heated to 75° C. by circulating hot water through the reactor jacket. Then 33 lb. of a 30% by weight aqueous solution of sodium lauryl sulfate was added and stirred until dissolved, followed by 2.8 lb. of ammonium persulfate. As soon as the latter was dissolved, a mixture of 3560 lb. uninhibited vinylidene chloride, 120 lb. methacrylonitrile, 200 lb. methyl methacrylate, and 120 lb. methacrylic acid was introduced at a rate of 23 lb./min. over a period of 174 minutes. Heat supplied through the jacket was gradually reduced as the reaction is exothermic, and the temperature of the charge was maintained near 75° C. The pressure gradually increased to 45 psi and remained there through the greater part of the reaction period. The reactor was vented, and after cooling to about 40° C., a sample of the resulting dispersion was removed and retained in a closed container; by analysis it was found to contain 1939 ppm $VCl_2$. Two 100 g portions of the sample were taken and designated parts 2 and 3, and the remainder designated part 1. To part 2 were added 0.04 g APS and 0.04 g MSB in 10 g water, and to part 3 were added 0.08 g APS and 0.08 g MSB in 10 g water. Part 1 was retained as a control with no further addition. All parts were analyzed at intervals for unreacted $VCl_2$, and the results are given in Table 6.

TABLE 6

| Dispersion | 1 | 2 | 3 |
|---|---|---|---|
| APS, g | 0 | 0.04 | 0.08 |
| MSB, g | 0 | 0.04 | 0.08 |
| APS, % by weight of polymer | 0 | 0.1 | 0.2 |
| MSB, % by weight of polymer | 0 | 0.1 | 0.2 |
| ppm $VCl_2$, | | | |
| 1.5 hours | 1939 | | |
| 16 hours | 1298 | 454 | 318 |
| 7 days | 1500 | 179 | 112 |

I claim:

1. A method for reducing the amount of free vinylidene chloride in an aqueous dispersion of a vinylidene chloride polymer, said dispersion containing 600 to 10,000 ppm free vinylidene chloride by weight of dispersion and said polymer containing at least 80% by weight of vinylidene chloride units, comprising adding to said dispersion a redox initiator in an amount of at least 50% of that which is sufficient to polymerize at least 98% of the total initial monomer charge in a period of 4 hours at a temperature no greater than 40° C., and then subjecting said dispersion to a temperature in the range from room temperature to no greater than 40° C. for a period of at least one hour.

2. In a method for preparing an aqueous dispersion of a vinylidene chloride polymer by contacting an aqueous emulsion of a mixture of monomers of which at least 80% by weight is vinylidene chloride with a first initiator which effects initiation thermally or by redox action, the improvement comprising reducing the amount of unpolymerized vinylidene chloride remaining when conversion of monomer to polymer is at least 99% complete, to below 600 ppm by weight of said dispersion by adding to said dispersion a second initiator which is a redox initiator in an amount of at least 0.05% by weight of the polymer of each component of the initiator, and then subjecting said dispersion to a temperature in the range from room temperature to no greater than 40° C. for a period of at least 1 hour.

3. The method of claim 1 wherein said redox initiator is a persulfate/bisulfite initiator.

4. The method of claim 3 wherein said aqueous dispersion is a dispersion prepared with the use of a persulfate/bisulfite redox initiator.

5. The method of claim 3 wherein said aqueous dispersion is a dispersion prepared by thermal initiation with the use of a persulfate.

6. The method of claim 5 wherein said persulfate is ammonium persulfate.

7. The method of claim 3 wherein said temperature to which said dispersion is subjected is room temperature.

8. The method of claim 7 wherein said period is at least 4 hours.

9. The method of claim 7 wherein said period is at least 20 hours.

10. The method of claim 3 wherein said dispersion contains an iron salt.

11. The method of claim 3 wherein said redox initiator is used in an amount of at least 80% of that which is sufficient to polymerize at least 98% of the total initial monomer charge.

12. The method of claim 11 wherein said redox initiator comprises equal weights of ammonium persulfate and meta sodium bisulfite and is added to said dispersion in aqueous solution having a concentration no greater than 6% by weight of said solution.

13. The method of claim 2 wherein the addition of said second initiator is after said conversion is at least 99.7% complete.

14. The method of claim 2 wherein said second initiator is a persulfate/bisulfite initiator.

15. The method of claim 14 wherein said first initiator is a persulfate/bisulfite redox initiator.

16. The method of claim 14 wherein said first initiator effects initiation thermally and is a persulfate.

17. The method of claim 14 wherein said temperature is room temperature.

18. The method of claim 17 wherein said period is at least 4 hours.

19. The method of claim 17 wherein said period is at least 20 hours.

20. The method of claim 14 wherein said dispersion contains an iron salt.

21. The method of claim 14 wherein said first initiator comprises equal weights of ammonium persulfate and meta sodium bisulfite, and said second initiator comprises equal weights of ammonium persulfate and meta sodium bisulfite each in an amount of 0.1 to 0.3% by weight of the polymer and is added to said dispersion in aqueous solution having a concentration no greater than 6% by weight of said solution.

* * * * *